(12) United States Patent
Srinivasan et al.

(10) Patent No.: US 8,826,318 B2
(45) Date of Patent: Sep. 2, 2014

(54) IMAGE BASED INTERACTIVE TICKER SYSTEM IN TELEVISION SIGNAL

(76) Inventors: Sudharshan Srinivasan, Fremont, CA (US); Jai Kumar, Cupertino, CA (US); Kothandraman Ramchandran, Fremont, CA (US)

( * ) Notice: Subject to any disclaimer, the term of this patent is extended or adjusted under 35 U.S.C. 154(b) by 933 days.

(21) Appl. No.: 12/459,712

(22) Filed: Jul. 6, 2009

(65) Prior Publication Data

US 2011/0004896 A1    Jan. 6, 2011

(51) Int. Cl.
*H04H 60/32* (2008.01)
*H04N 7/10* (2006.01)
*H04N 7/025* (2006.01)
*H04N 7/16* (2011.01)
*H04N 21/81* (2011.01)
*G06Q 30/02* (2012.01)
*H04N 21/44* (2011.01)
*H04N 21/234* (2011.01)
*H04N 21/2665* (2011.01)
*H04N 21/488* (2011.01)

(52) U.S. Cl.
CPC ..... *H04N 21/44016* (2013.01); *H04N 21/8153* (2013.01); *G06Q 30/02* (2013.01); *H04N 21/812* (2013.01); *H04N 21/23424* (2013.01); *H04N 21/2665* (2013.01); *H04N 21/4886* (2013.01)
USPC ................................ 725/20; 725/32; 725/145

(58) Field of Classification Search
None
See application file for complete search history.

(56) References Cited

U.S. PATENT DOCUMENTS

| | | | | |
|---|---|---|---|---|
| 5,319,382 A | * | 6/1994 | Fitzpatrick et al. | 345/621 |
| 2003/0167467 A1 | * | 9/2003 | Allen et al. | 725/47 |
| 2006/0259613 A1 | * | 11/2006 | Othmer | 709/224 |

* cited by examiner

*Primary Examiner* — Mark D Featherstone

(57) ABSTRACT

A system to provide personalized promotional content using a broadcast television signal is described. Broadcast television content contains an information band called as ticker band (38) that carries promotional information along with a video signal. This promotional content is captured and stored as several images that correspond to information sets (40). This captured content that is image based is played out in the television optionally with original promotional content, thus providing a personalized promotional information band. This system enables capturing and recalling promotional information reliably for both over the air and terrestrial television broadcasts and works with existing television receivers without needing upgrades to video distribution networks.

19 Claims, 3 Drawing Sheets

INTERACTIVE TICKER SYSTEM OF PRESENT INVENTION

INTERACTIVE TICKER SYSTEM OF PRESENT INVENTION

US 8,826,318 B2

IMAGE BASED INTERACTIVE TICKER SYSTEM IN TELEVISION SIGNAL

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

Figure 1:
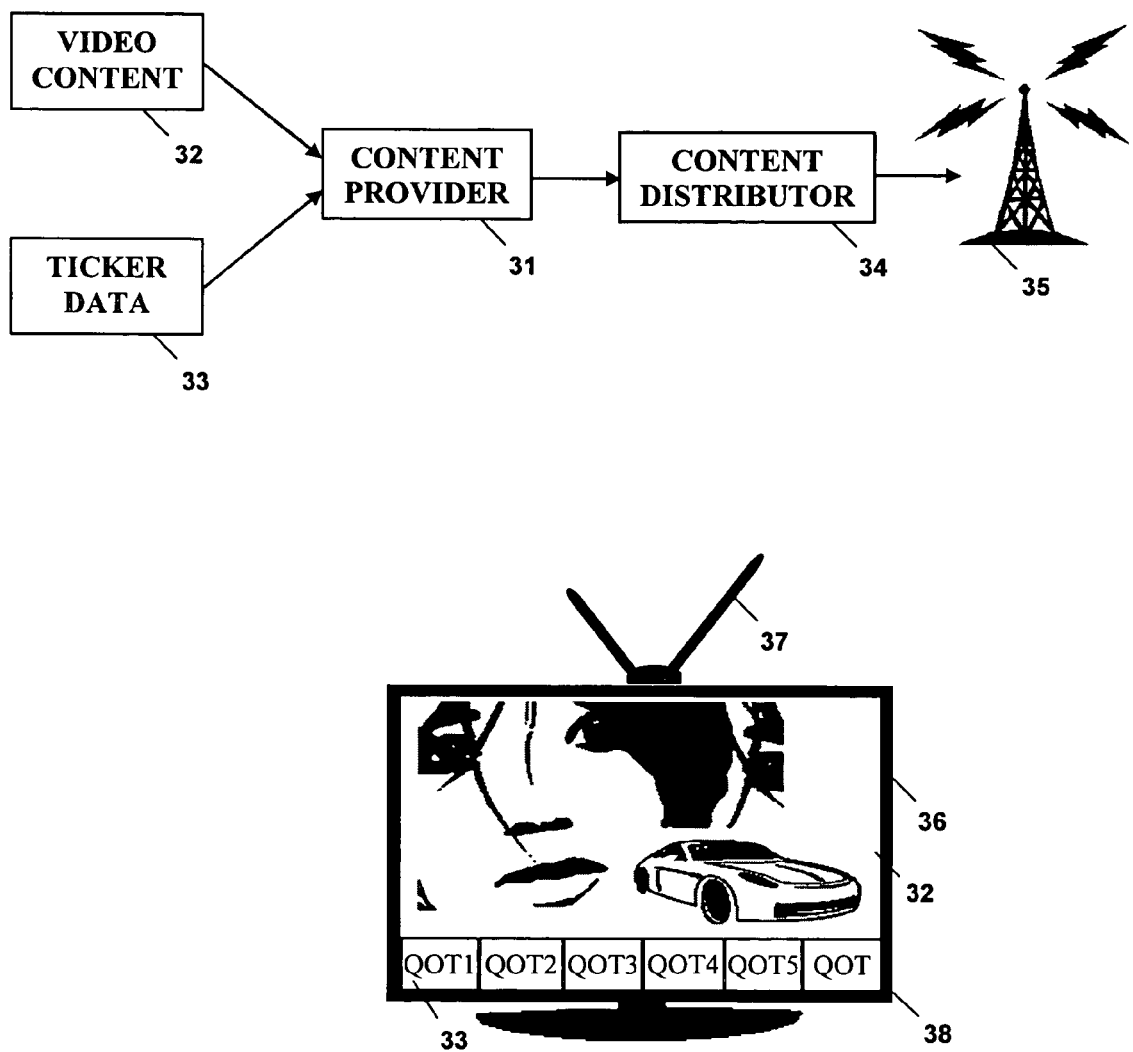

The present invention generally relates to information broadcast in a television broadcast system and specifically to methods that use a moving information band further referred to as a ticker to deliver interactive information.

2. Prior Art

Television broadcast systems broadcast television signals. These signals can be either digital or analog. In either case, television content that is broadcast usually occupies the full television screen. But in certain cases such as news broadcasts, a scrolling band of information is added to the television signal and is visible at the bottom of a screen. This scrolling band of information is further referred to as a ticker, or a ticker band.

The ticker usually consists of information that is applicable to a wide audience. Since most television receivers can only receive information, the information contained in a ticker is lost after it has been displayed for a few seconds or until it is repeated.

There have been several prior art attempts at capturing information from this ticker. Most prior systems prescribe using an optical character recognition system to extract information out of a ticker. But such systems are not reliable as television signals can be unreliable as the medium of broadcast can suffer from signal errors. Over the air broadcast systems in particular suffer from interference, fading and other signal problems, and hence cannot guarantee reception of reliable ticker information all the time. Hence relying on optical character recognition to extract information from ticker is not reliable. Signal error problems are applicable to both analog and digital television signals. Over the air digital transmission may be resilient to errors and such errors may be acceptable for moving picture content, but for information such as text, errors will translate to erroneous character data.

Interactive ticker system offers a capability for a user to interact with information present in the ticker. This could include stock market prices, product sale information or coupons. Such information may be selectively stored and recalled for later use by a user.

But since a television receiver is usually not a programmable device, there is no way to get access to this ticker information in a conventional television. But newer generation television receivers are equipped with general purpose application processors that can run software programs inside a television. There are also set top boxes that have such processing capabilities. But all these programmable devices of prior art offer capturing information from a ticker using optical character recognition. This as said before is not a reliable means to get information that can be recalled for later use.

There are also systems that embed hidden information in television signals using blanking intervals, but such systems cannot be used by users of existing television sets that cannot process this hidden data. Such systems also mandate expensive upgrades to content distribution systems.

Hence there is a need for a system that enables capture of information from an information ticker in a television broadcast that is reliable under all circumstances including when watching television in a room using cable television input or using over the air broadcasts, and is available to all users with or without interactive capabilities, and without mandating expensive hardware and infrastructure upgrades to content distributors.

If such a system exists then it could be used for interactive commerce opportunities enabling a lot of small businesses to advertise their products while providing interaction to consumers at a fraction of advertising costs as compared with current advertisement methods in a television.

It is the subject of present invention to describe an interactive ticker system that enables reliable information storage and retrieval from a ticker band in television signal, and an electronic commerce system that leverages the reliable interactive ticker system without the need for expensive system upgrades at content distributors end.

Such a system is not known to exist in prior art.

Following paragraphs in current section describe relevant prior art in this field.

Prior art US Doc 20030167467 describes an interactive ticker system in which a television viewer is provided with video content along with interactive ticker information. But this method uses a separate ticker data retrieval channel and corresponding decoders or tuners to get and process such information. This method mandates a secondary interface in addition to a basic television tuner to get to interactive ticker information. The information in this ticker system can only be seen by users who have access to additional tuner or data retrieval system prescribed by this method and not by users who have conventional television sets. This method does not address capturing of ticker data from a single television signal but mandates a separate channel that is decoded separately. Hence this method cannot be used with conventional analog television broadcasts. Supporting a parallel channel of ticker data mandates expensive upgrades to infrastructure at content distributors end.

Prior art U.S. Pat. No. 6,426,778 describes a system where interactive information related to a video is transmitted in parallel to the main content stream. But this does not address the need to capture information from a ticker that is embedded inside a regular television signal.

As can be seen from above, all known prior arts suffer from some limitations in offering a solution to capture and store information from a ticker embedded in a television signal.

OBJECTS AND ADVANTAGES

Accordingly, several objects and advantages of the present invention are:

a) to provide a method that enables capturing information reliably from a ticker in a television signal such that information is available to regular television viewers as well as viewers who have devices that can process television signals to provide additional interaction capabilities without mandating changes to television content distributors;

b) to provide a system to enable selective interactive use of broadcast ticker information on a per user basis; and c) to provide an electronic commerce system based on this interactive ticker system.

SUMMARY

In accordance with present invention, an interactive ticker system is described that enables reliable storage, filtering and reuse of information obtained from a ticker information band of a television signal.

This is achieved by capturing images representing information in a ticker band and storing these images for future viewing and filtering, instead of using optical character techniques to extract data out of a ticker band.

As this method uses image data that is to be consumed by a human being and not by another computing device, it is highly error resilient as human beings can ignore errors to images and focus on the visible content.

By storing images and not converting to textual data that might lead to errors, it is guaranteed that information contained in a ticker band is stored reliably with or without background noise, and later retrieved for further use by a user.

Storing images representing data sets in a ticker band enables the functionality of an interactive ticker system including storing needed data, getting updates to needed data, and filtering out unwanted data.

Such a system using image capture and storage is feasible, as the ticker information usually has fixed bounds for each set of information or has clear boundary lines that may be easily recognized by simple software methods. Recognizing bounds of ticker information sets and recognizing the total number of sets in a ticker band before the information repeats, enables indexing of all information sets in a ticker band.

Hence a user equipped with a device that can access television signals and has image processing capabilities, can index all the ticker information sets contained in a ticker band. Once a user is able to index all information sets, the user can control which ticker sets are of interest and allow only those information sets to be visible in a television, hence providing a filtered ticker information band.

A user who does not have a device with this capability will continue to see the ticker as usual, but a user who has a device that can have access to television signal along with image processing capabilities, can selectively pick up information that is of interest to focus on updates at particular ticker indices, thus providing an interactive ticker system.

Since only content of television is changed minimally to provide boundaries of information sets, no change to broadcast distributor network is necessary. This system can be implemented without a need for expensive infrastructure upgrades at content provider or distributors end.

If in some television channels the bounds of a ticker information set are not easily recognized, then an agreement is made with content providers to limit the bounds of each information set to agreed upon boundaries. But such a change can be incorporated at content providers end, and does not need infrastructure change at content distributors end.

Hence it can be seen that combining image processing techniques to manage storage, retrieval and boundary analysis of a information ticker in a television signal, results in an unobvious advantage of providing a reliable interactive ticker system without needing expensive upgrades to content distribution infrastructure.

DRAWINGS

Figures

Figure 2:
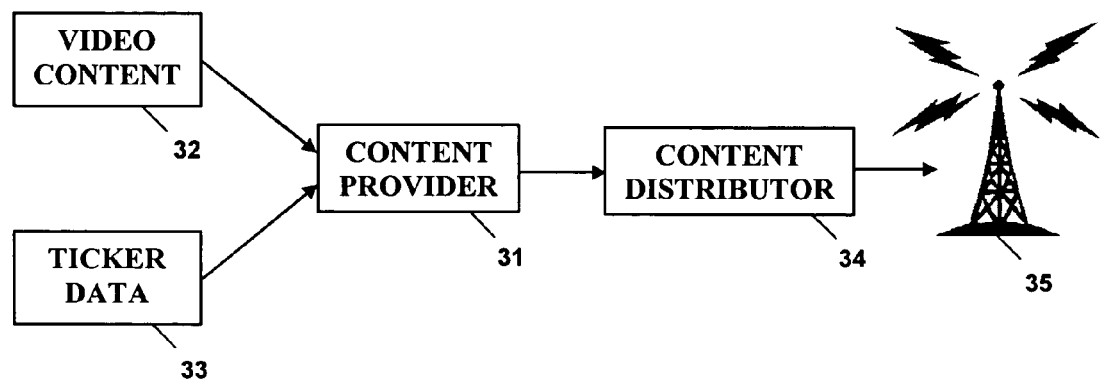
Figure 2:
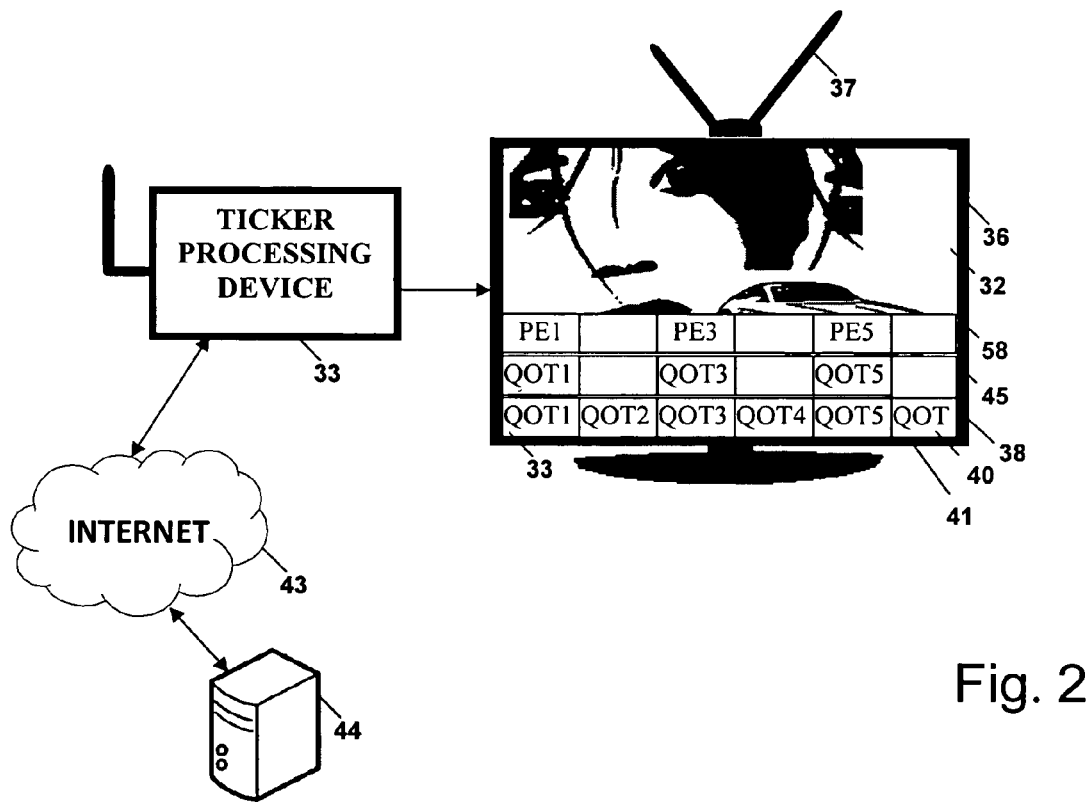
Figure 3:
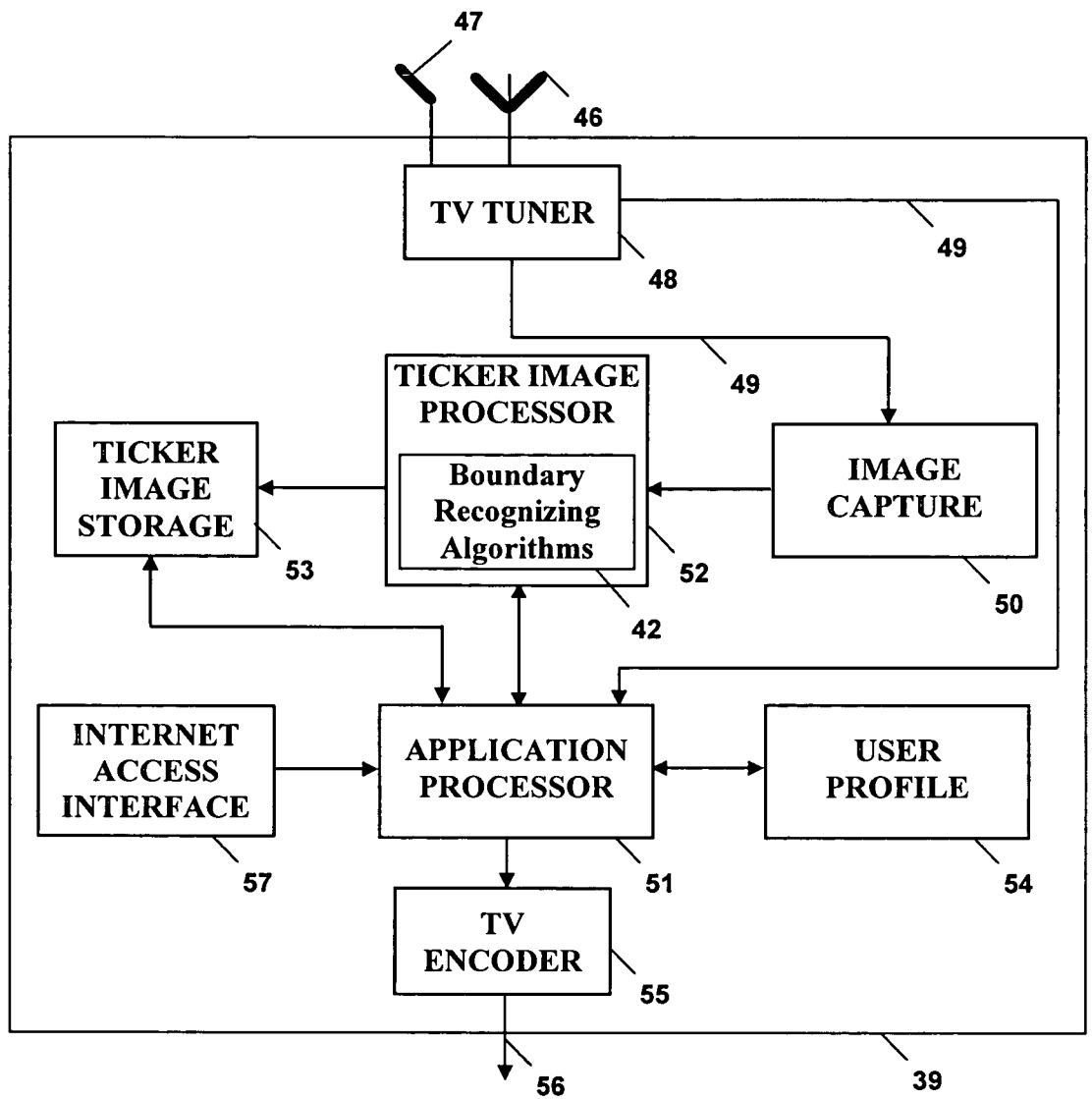

FIG. 1 shows prior art non interactive ticker system.
FIG. 2 shows interactive ticker broadcast of present invention using ticker processing device.
FIG. 3 shows functional blocks of ticker processing device.

REFERENCE NUMERALS

31 Content provider
32 video content
33 ticker data
34 content distributor
35 television transmitter
36 Television receiver
37 television antenna
38 ticker band
39 ticker processing device
40 information set
41 information set boundary
42 boundary recognizing graphics algorithms
43 internet
44 web server
45 filtered information set
46 antenna
47 wired video input
48 television tuner
49 digital video content
50 image capture module
51 application processor
52 ticker image processor module
53 ticker image storage module
54 user preference storage module
55 television encoder module
56 encoded television signal
57 internet access interface
58 price to earnings ratio

DETAILED DESCRIPTION OF PREFERRED EMBODIMENT

In the descriptions below, first architecture of prior art ticker broadcasting system is described. This is followed by architecture of interactive ticker system of present invention. Then details of a ticker information band are described followed by details of ticker processing device.

FIG. 1 shows prior art ticker broadcast and reception in analog or digital television broadcasting system. Content provider 31 combines video content 32 with ticker data 33 and sends to content distributor 34 for television broadcast. Content distributor 34 broadcasts television signals in various frequency bands using television transmitter 35. Television receiver 36 receives television signals using television antenna 37 and displays video content 32 along with ticker data 33 in ticker band 38. In most prior systems, ticker band 38 displayed on television receiver 36 is not customizable by television viewers and hence viewer is not able to control what is displayed in ticker band 38 and also unable to store certain information for future viewing, since ticker band 38 is constantly changing. Some prior art systems, use optical character recognition technology in television receiver 36 to convert ticker band 38 into character stream and this enables viewers to filter information and also store for future use. But broadcast television signals are susceptible to interference, fading and other signal problems. Optical character recognition technology does not provide reliable interactive ticker solution under these circumstances.

FIG. 2 shows interactive ticker system of present invention using ticker processing device 39. Similar to prior art system, video content 32 is combined with ticker data 33 at content provider 31 which is then routed to content distributor 34. Content distributor 34 using television transmitter 35 broadcasts the combined video content as broadcast signals to television receivers 36. Ticker data 33 can be received by content providers 31 from any electronic commerce vendor or advertisers to be blended in with broadcast television content.

In present invention this signal having combined video content is first received by ticker processing device 39 which then routes the combined video content to television receiver 36 after necessary processing.

Ticker processing device 39 uses image capture techniques to capture and store images representing information in ticker band 38 and enables later retrieval of stored images for further use by a user. As this method stores image data instead of converting to text, it is highly error resilient as human beings can overlook background noise and focus on the visible content even in presence of noise.

Ticker band 38 is made up of several parts of information where each part represents information set 40 corresponding to promotional or informational content. Each part is a set as more than one type of information may be present in a single part and may be represented as an icon with optional text combination.

For exemplary purposes, stock quote information is shown in ticker band 38. Here the information set consists of just the stock quote information.

Each information set 40 is separated by information set boundary 41. This information set boundary 41 is recognized by boundary recognizing graphics algorithms 42 that is part of ticker processing device 39. Boundary recognizing graphics algorithms 42 can be one of many algorithms that enable detection of boundaries between two information sets. These could be based on color gradients, line recognition, or gap recognition algorithms. Boundary recognizing graphics algorithms 42 partition information contained in ticker band 38 into several information sets 40 and assign indices to each information set 40. These indices may be used for filtering the information sets that are shown to a user for getting more information related to information sets from the internet 43 and corresponding information related web server 44.

This figure shows that in addition to seeing a full ticker band 38, a user can optionally choose to see filtered information set 45. This filtered information set 45 contains subset of information from ticker band 38 based on user preferences.

This figure also shows that in addition to showing filtered information set 45, a user can choose to have additional information from internet that correspond to information in ticker band 38. This information maybe retrieved based on indices generated by boundary recognizing algorithms that are passed to a related web server 44.

FIG. 3 shows function blocks of ticker processing device 39 of present invention. Ticker processing device 39 receives broadcast television signal through antenna 46 input or wired video input 47 and the received signal is then sent to television tuner 48. Television tuner 48 tunes to specific television channel as per user preference and converts the signal to digital video content 49. This digital video content 49 is sent to image capture module 50 and to application processor 51.

Image capture module 50 captures images from television signal in the area that represents ticker band 38. Captured images representing ticker band are then routed to ticker image processor module 52. Ticker image processor module 52 uses boundary recognizing algorithms 42 to partition ticker band 38 into information sets 40 and indexes each of the information sets so that these indices maybe used to get further data about information contained in these information sets from the internet 43 or use these indices to filter information sets shown to the user. After partitioning ticker band information to information sets, ticker image processor module 52 can optionally store the partitioned and indexed images into ticker image storage module 53.

Then the information sets are routed to application processor 51 which runs filters on the information sets to select what a user wants to see based on user preferences stored in user preference storage module 54.

After running filters subset of information sets 45 is selected and blended with digital video content 49 and then routed to television receiver using television encoder module 55 as encoded television signal 56. Upon user request, further information can also be retrieved using ticker band indices from internet 43 using internet access interface 57. This is shown in FIG. 2, as additional information band for filtered stock quotes such as price to earnings ratio 58.

Since indices of information sets can be used to query web server 44 for more information, this system can be used for electronic commerce applications where a user seeing personalized ticker information can track products and changes to product attributes such as pricing or associated coupons and then interact with electronic commerce web server 44.

ADVANTAGES

From the description above a number of advantages of this interactive ticker system become evident:
a) a method is provided that enables capturing information reliably from a ticker in a television signal such that information is available to regular television viewers as well as viewers who have devices that can process television signals to provide additional interaction capabilities without mandating changes to television content distributors;
b) a system is provided to enable selective interactive use of broadcast ticker information on a per user basis; and
c) an electronic commerce system is provided based on this interactive ticker system.

CONCLUSION, RAMIFICATIONS AND SCOPE

Accordingly, the reader will see that an interactive ticker system is provided that enables reliable storage and retrieval of ticker information in a television signal, and can be implemented by using a device at users end with no change to content distributors end and perhaps minimal change at content providers end.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

We claim:

1. A method of providing interaction capabilities with information band in a television signal, further referred to as ticker band, comprising:
   intercepting said television signal using a intercept device to get video frames comprising video content and ticker band;
   identifying two dimensional coordinates representing area of ticker band in relation to one of said frames of said television signal;
   capturing a ticker snapshot image of said area of ticker band at said coordinates wherein area of said snapshot image is selected from group consisting of full area, and partial area;
   detecting boundaries of information sets inside said ticker snapshot image using boundary recognizing graphics algorithms;
   automatically partitioning said ticker snapshot image into plurality of information slots comprising subset images representing said information sets based on said boundaries detected, further referred to as information images in said information slots;

assigning a slot index value and a screen coordinate to each of said information slots of said ticker snapshot image, wherein said slot index value increments sequentially from a configurable beginning integer value;

marking configurable number of said information slots as slots that are of interest to user;

extracting said information images from said information slots that are of interest to user into temporary memory buffers of said intercept device;

assigning a image index value to each of said extracted information images;

and storing said extracted information images into a list of images in a storage medium associated with said intercept device along with said image index value.

2. The method of providing interaction capabilities with information band in a television signal of claim 1, further comprising:

selectively retrieving said stored information images from said storage medium using said image index value;

blending said selected information images with television content to generate blended content at screen coordinates selected from group consisting of screen coordinates associated with said information slots, screen coordinates that are not associated with said information slots, and a combination of screen coordinates where some retrieved images are blended at screen coordinates associated with said information slots and some retrieved images are blended at screen coordinates not associated with said information slots, thereby enabling overlay placement, non overlay placement, and combined overlay and non overlay placement of said retrieved images in relation to coordinates of said ticker image; and displaying said blended content in a television receiver.

3. The method of providing interaction capabilities with information band in a television signal of claim 1, further comprising:

recognizing end of ticker during said automatic partitioning using ticker end recognizing methods selected from group consisting of image matching method that matches a start image with a said information image, image matching method that recognizes a special boundary image indicative of end of ticker, and counter method that keeps track of said slot indices and wraps around after a configurable number of slot indices have been assigned;

resetting said slot index to said beginning integer value after said recognition is successful;

continuing said automatic partitioning of said image ticker into said information slots;

stopping said extraction, said image index value assignment, and said storage of said information images corresponding to information slots that are not marked as slots that are of interest to said user at said intercept device to save power; and continuing said extraction, said image index value assignment, and said storage of said information images corresponding to said information slots that are marked as slots that are of interest to said user.

4. The method of providing interaction capabilities with information band in a television signal of claim 1, wherein said signal is selected from group consisting of analog television signal, and digital television signal.

5. The method of providing interaction capabilities with information band in a television signal of claim 1, wherein said intercept device is selected from group consisting of mobile phone, smartphone, personal digital assistant, set top box, and hardware module inside a television receiver capable of intercepting television signals.

6. The method of providing interaction capabilities with information band in a television signal of claim 1, wherein said number of information slots is selected from group consisting of a constant number, and a configurable number based on user preference, wherein size of each slot is configurable.

7. The method of providing interaction capabilities with information band in a television signal of claim 1, wherein said information set has text content, and image content.

8. The method of providing interaction capabilities with information band in a television signal of claim 1, wherein said boundary recognizing graphics algorithm is selected from group consisting of line recognition algorithm, color gradient recognition algorithm and gap recognition algorithm.

9. The method of providing interaction capabilities with information band in a television signal of claim 2, wherein said blending is at least one of transparent image blending, opaque image blending, and translucent image blending.

10. The method of providing interaction capabilities with information band in a television signal of claim 2, wherein number of said stored information images that are blended is configured by a user in order to provide a filtered and personalized view of stored images.

11. The method of providing interaction capabilities with information band in a television signal of claim 2, further comprising:

using slot indices corresponding to slots that are marked as slots of interest at said intercept device as query keys to query for further information related to said slot index from an information server coupled to internet;

receiving at said intercept device said further information related to said slot index;

converting said further information into an image representation and displaying said further information using said blending method onto said original video content.

12. The method of providing interaction capabilities with information band in a television signal of claim 11, further comprising:

combining additional user input with said slot index that is marked as a slot of interest to said user into a query string for enabling electronic commerce applications related to said information image corresponding to said slot index that is marked as a slot of interest to said user;

requesting further information related to said slot index marked as a slot of interest to said user using said query string from said electronic commerce applications;

receiving at said intercept device response to said query string and converting said response to said query string into an image representation;

and displaying said further information using said blending method onto said original video content.

13. An interactive ticker system for providing interaction capabilities with information band of video content in a television signal, further referred to as a ticker band, comprising:

a intercept device that can intercept said television signal to detect, save and retrieve information images corresponding to information parts of said ticker band wherein said detection of said information images is achieved by an automatic image partitioning module at said intercept device that uses image boundary recognizing graphics algorithms to detect and partition image sub areas corresponding to said information band;

a television receiver coupled to said intercept device;

a communication interface in said intercept device to provide internet connectivity to get further information related to said information images; and a image blending module coupled to said intercept device that enables said captured images to be optionally blended with original video content.

14. The interactive ticker system of claim 13, further comprising:

video distribution network distributing video content comprising said ticker band and other video content in said signal; and video content producer network capable of producing said video content and receiving promotional information that can fit into information slots of said ticker band.

15. The interactive ticker system of claim 13, wherein said intercept device is selected from group consisting of mobile phone, smartphone, personal digital assistant, set top box, and hardware module inside a television receiver capable of intercepting television signals.

16. The interactive ticker system of claim 13, wherein said television receiver is selected from group consisting of analog television receiver, and digital television receiver.

17. The interactive ticker system of claim 13, wherein said communication interface for internet connection is selected from group consisting of wireless internet connection, and wireline internet connection interface.

18. An intercept device to intercept a video signal to extract information from information band also referred to as ticker band in said signal into sets of images that are indexed, comprising:

television tuner to tune into video signals of digital and analog television broadcasts;

an image capture module coupled to said television tuner to enable capture of images from said video content corresponding to said ticker band;

a ticker image processor module coupled to said image capture module enabling boundary recognizing algorithms in said images for automatic partitioning of said ticker band information into information slots comprising information images;

an application processor coupled to said television tuner and said ticker image processor module enabling combining said captured images with said signal to create a combined signal;

a storage medium coupled to said image processor module and said application processor that stores captured images; and a television encoder module coupled to said application processor module that enables producing television output signal to be consumed by a television.

19. The intercept device of claim 18, further comprising:

an interne access interface enabling further information retrieval based on said indices of said captured images.

* * * * *